(12) United States Patent
Liu et al.

(10) Patent No.: US 6,964,156 B2
(45) Date of Patent: Nov. 15, 2005

(54) INTERMITTENT APPLICATION OF SYNGAS TO NOX TRAP AND/OR DIESEL ENGINE

(75) Inventors: Ke Liu, East Longmeadow, MA (US); Wayne G. Wnuck, South Windsor, CT (US); Willem P. Leenhouts, VN Woerden (NL)

(73) Assignee: HydrogenSource LLC, South Windsor, CT (US)

( * ) Notice: Subject to any disclaimer, the term of this patent is extended or adjusted under 35 U.S.C. 154(b) by 79 days.

(21) Appl. No.: 10/691,794

(22) Filed: Oct. 23, 2003

(65) Prior Publication Data

US 2005/0086931 A1 Apr. 28, 2005

(51) Int. Cl.[7] ................................................. F01N 3/00
(52) U.S. Cl. ........................... 60/274; 60/286; 60/295; 60/303; 123/1 A; 123/3
(58) Field of Search .......................... 60/274, 275, 285, 60/286, 295, 301, 303; 123/1 A, 3, DIG. 12

(56) References Cited

U.S. PATENT DOCUMENTS

| | | | | |
|---|---|---|---|---|
| 5,921,076 A | * | 7/1999 | Krutzsch et al. | 60/274 |
| 5,947,063 A | * | 9/1999 | Smith et al. | 123/3 |
| 6,122,909 A | * | 9/2000 | Murphy et al. | 60/286 |
| 6,560,958 B1 | * | 5/2003 | Bromberg et al. | 60/275 |
| 6,655,130 B1 | * | 12/2003 | Kirwan et al. | 60/284 |
| 6,718,753 B2 | * | 4/2004 | Bromberg et al. | 60/275 |
| 6,758,035 B2 | * | 7/2004 | Smaling | 60/285 |
| 6,810,658 B2 | * | 11/2004 | Kaupert et al. | 60/274 |
| 6,820,417 B2 | * | 11/2004 | May et al. | 60/297 |
| 6,832,473 B2 | * | 12/2004 | Kupe et al. | 60/286 |
| 6,845,608 B2 | * | 1/2005 | Klenk et al. | 60/274 |
| 2004/0020188 A1 | * | 2/2004 | Kramer et al. | 60/275 |
| 2004/0020447 A1 | * | 2/2004 | Taylor et al. | 123/3 |

OTHER PUBLICATIONS

U.S. Appl. No. 10/159,369, filed May 31, 2002.

* cited by examiner

Primary Examiner—Tu M. Nguyen
(74) Attorney, Agent, or Firm—M. P. Williams

(57) ABSTRACT

A catalytic partial oxidizer (30) provides syngas (hydrogen and carbon monoxide) to an apparatus intermittently using syngas such as valves (34) feeding NOx traps (35), for brief periods of time. During turndown times when syngas is not being used, either the output of the CPO is diverted (33) to the inlet (13) of an engine (12) through the engine gas recycle (EGR) system (43–46), or the amount of fuel (19) and exhaust (23) applied to the CPO is reduced (24, 26; 59, 60) so that the CPO merely stays warm and in a reduced state, thereby being ready to restart immediately. A mini-CPO (62) may provide syngas and heat to the major CPO (30) during the turndown time when syngas is not being used by the NOx traps.

4 Claims, 3 Drawing Sheets

INTERMITTENT APPLICATION OF SYNGAS TO NOX TRAP AND/OR DIESEL ENGINE

TECHNICAL FIELD

This invention relates to accommodating the intermittent application of synthetically generated mix of hydrogen, carbon monoxide and other gases (syngas, hereinafter) in vehicles having internal combustion engines, for any intermittent utilization, such as regeneration of the adsorption material in NOx traps, either (a) by diverting the syngas from the consuming apparatus (such as NOx traps) to the inlet of the engine, (b) by reducing the intake of the syngas generator so that it merely remains warm, or (c) using a continuously running mini-CPO to feed the main CPO sufficiently to keep it warm, so it can be restarted immediately.

BACKGROUND ART

On vehicles having internal combustion engines, in order to reduce oxides of nitrogen (NOx) in the exhaust, it is known to produce a gaseous mixture of hydrogen, carbon monoxide (referred to hereinafter as syngas), which can be used in a variety of ways, such as in the regeneration of adsorption material in NOx traps. The generation of syngas from engine fuel, engine exhaust and air, for use in regenerating NOx traps is disclosed in copending U.S. patent application Ser. No. 10/243,105, filed Sep. 13, 2002. However, the adsorption material may typically be able to absorb NOx in the exhaust for on the order of 80–100 seconds, and yet be completely regenerated in on the order of 5–10 seconds. Another example of such a system is illustrated in commonly owned copending U.S. patent application Ser. No. 10/309,712, filed Dec. 4, 2002.

A typical syngas generator may comprise a catalytic partial oxidizer (CPO hereinafter) which can reform liquid hydrocarbon fuel. When syngas is required, the CPO must be at or above a certain temperature in order to generate the effective amount of syngas within just a few seconds. To do this, the CPO must remain heated; otherwise, there would be a great challenge for starting up and shutting down a CPO frequently. Startup and shutdown of the CPO requires significant, complex controls, thus increasing the cost of the system. Furthermore, on start-up, the catalyst within the CPO potentially goes through a dangerous oxygen/carbon ratio locally, which could potentially melt or damage the CPO catalyst.

Although a CPO could simply be left in the operating condition, and the syngas discarded, this would result in a significant fuel penalty, causing an impermissibly low overall efficiency of the engine system.

DISCLOSURE OF INVENTION

Objects of the invention include an improved utilization of a CPO in providing syngas to NOx traps; an efficient generation of syngas for regeneration of NOx traps; a simpler production of syngas in a vehicle; efficient generation of syngas for intermittent use; and improvements in overall efficiency and clean operation of internal combustion engines in vehicles, particularly diesel engines in trucks.

This invention is predicated in part on the realization that if a CPO is kept warm during a turn down portion of a cycle, when syngas is not required, it can be restarted easily within one or two seconds, with very simple controls. The invention is partly predicated on the realization that adding hydrogen-rich gas, such as syngas, to the fuel intake of an internal combustion engine increases the flammability of the mixture and thereby creates a better flame front so that wall-wetting and engine NOx emissions are reduced.

According to the present invention, during a period of time when syngas is not required, for instance, for regeneration of NOx trap adsorbent material, the arrangement of the syngas generator in the overall system is altered either (a) by diverting the generated syngas to an engine fuel inlet via the engine gas recycle (EGR) stream, so as to improve the combustion therein, or (b) by reducing the fuel and other inputs to the CPO so as to merely maintain the CPO sufficiently warm that it can restart within one or two seconds.

In a first embodiment, the syngas is diverted into the EGR during the time when the syngas is not needed for its principal application, such as NOx trap regeneration. In another embodiment of the invention, the amounts of fuel and exhaust are significantly reduced during the period of time when syngas is not required. In a third embodiment of the invention, reduced amounts of fuel and exhaust are mixed and applied to a continuously running mini CPO, the output of which is applied to the main CPO that supplies syngas to an NOx trap; the output of the mini CPO provides heat as well as an easily lighted fuel so that maintaining a near-operating temperature is very simple.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
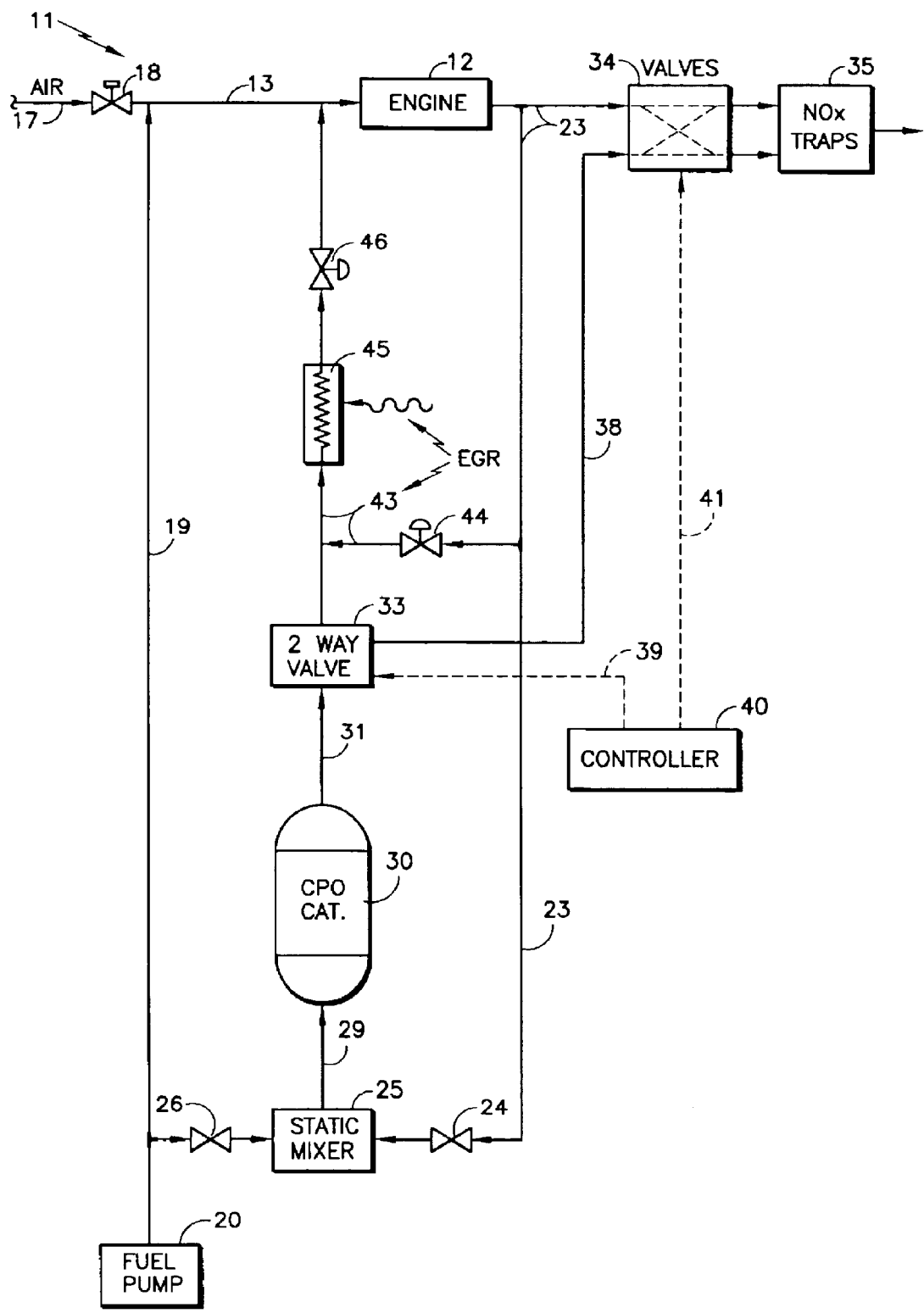
FIG. 1 is a simplified schematic of an engine system which diverts the output of a CPO from NOx traps to a fuel inlet to the engine.

Referring to FIG. 1, an engine system 11 includes an internal combustion engine 12 which receives a mixture of fuel and air in a line 13. Air on a line 17 typically is provided by a turbo charger, the pressure of the air being suitably regulated by a valve 18. Fuel is provided on a line 19 from a fuel pump 20. The exhaust of the engine on a line 23 is provided through a fixed orifice 24 to a static mixer 25 along with fuel from the line 19, which is passed through a fixed orifice 26. The output of the static mixer on a line 29 is applied to a principal CPO 30, which generates a gaseous mixture of hydrogen, carbon monoxide and other gases, all as is conventional and not relevant to the invention. The output of the CPO on a line 31 is applied to a two-way valve 33, although it could be a valve having more selections as is described hereinafter.

The exhaust on line 23 is also provided to an apparatus, utilizing syngas, such as a set of valves 34 feeding a pair of NOx traps 35, which may be as disclosed in the aforementioned application Ser. No. 10/243,105, and may employ, for example, barium carbonate as the NOx adsorption material for reducing NOx emissions of an engine. The other input to the valves 34 on a line 38 is provided by one of the settings of the two-way valve 33. Thus, during the short period of time (5–10 seconds, typically) when the adsorbent material in one of the NOx traps is being regenerated, the two-way valve 33 will be caused by a signal 39 from a controller 40 to provide an effective amount of syngas to the valves 34; in this case, an effective amount is the amount needed to regenerate an NOx trap. The controller 40 switches the valves 34 back and forth by means of signals 41 so that each of the NOx traps alternatively adsorbs NOx in a larger period (typically on the order of 80–100 seconds) and then is regenerated by the syngas during a smaller period (typically on the order of 5–10 seconds).

When syngas is not required, the controller 40, via the signal 39, will cause the setting of the two-way valve 33 to apply syngas to an EGR line 43 that receives exhaust through a conventional EGR valve 44 from the exhaust line 23. The EGR gas is cooled in a heat exchanger 45, passed through another conventional EGR valve 46 and thence mixed with the air/fuel mixture in the line 13 for combustion within the engine 12. The EGR components 43—46 are conventional.

In the apparatus of FIG. 1, the CPO is allowed to function at its rated capacity, to provide an effective or adequate amount of syngas, continuously when the engine 12 is in normal operation. The output of the CPO is alternatively provided to the NOx traps 35 or diverted to the inlet 13 of the engine 12. Since the syngas improves engine operation and reduces its unwanted emissions, the amount of fuel utilized to generate the syngas does not result in an unacceptable efficiency loss of the overall engine system. By causing the CPO to operate continuously (during normal engine operation), the CPO operates very efficiently and the overall system efficiency is thereby improved.

Figure 2:
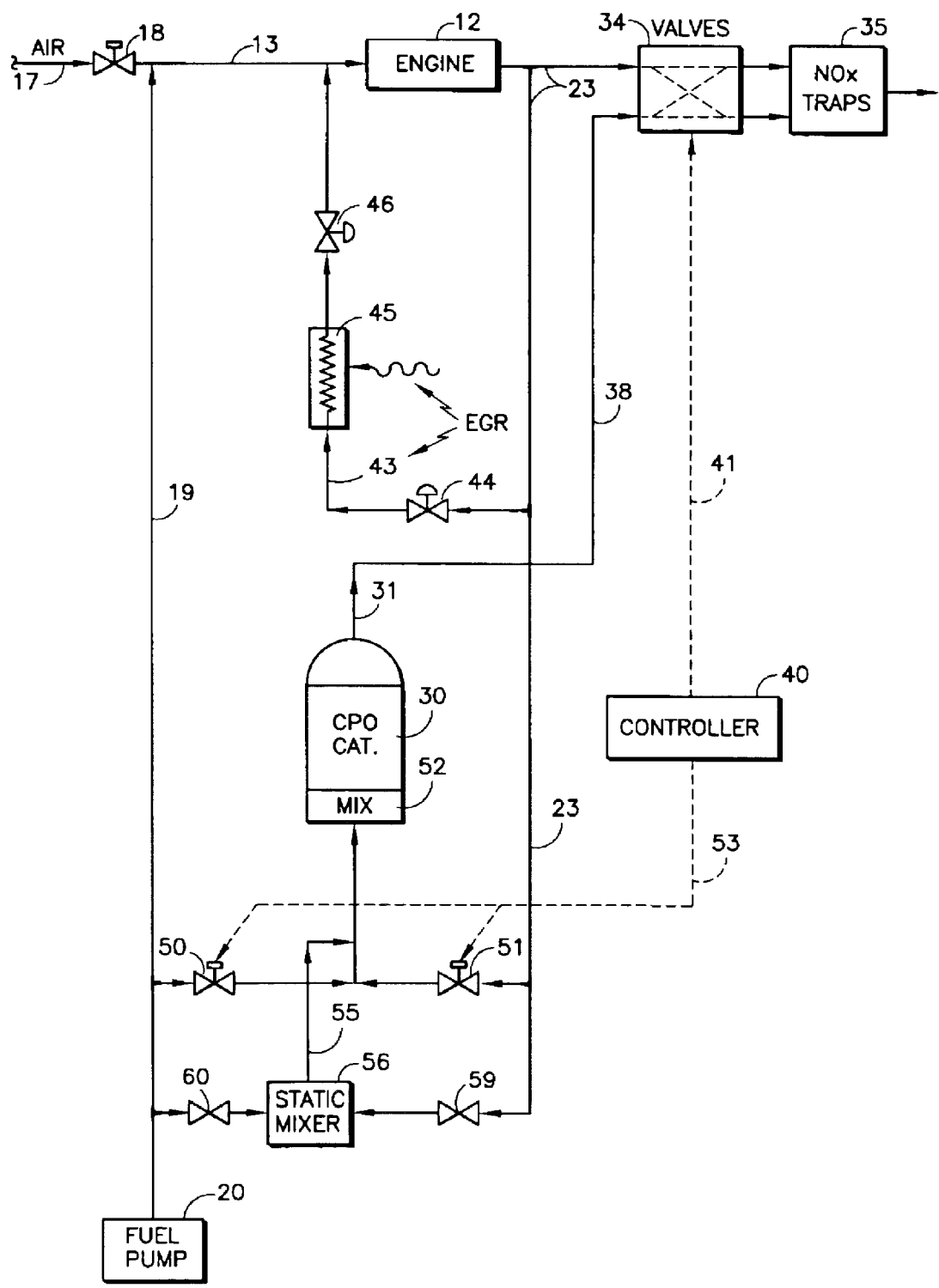
FIG. 2 is a schematic diagram of an engine system in which the amount of fuel and exhaust applied to a CPO is significantly reduced during periods when the output of the CPO is not required.

In FIG. 2, a different embodiment of the invention does not divert syngas during the periods when it is not required to regenerate the NOx traps. Instead, the intake to the CPO is severely curtailed. A pair of solenoid valves 50, 51 are used in place of the fixed orifices 24, 26 (FIG. 1) and the static mixture 25. When the valves 50, 51 are open, a required amount of exhaust and fuel is provided to the mixer section 52 of the CPO 30, and the CPO produces the effective amount of syngas for regenerating the NOx traps 35. In FIG. 2, the output line 31 from the CPO is connected directly to the input line of the valves 34.

When syngas is not required by the NOx traps, the valves 50, 51 are closed off by a signal 53 from the controller 40 so that the major flows of exhaust and fuel are no longer provided to the CPO 30. Instead, the CPO must rely on a small amount of mixture in a line 55 provided by a static mixer 56 which in turn receives a limited amount of exhaust and a limited amount of fuel through fixed orifices 59, 60, respectively. The amount of exhaust and fuel which is provided to the CPO during the turndown (non-regenerating) portion of each cycle is just sufficient to provide hot syngas which will keep the CPO 30 warm enough to maintain the CPO 30 in a reducing environment which allows it to restart immediately after turndown ends, while producing only traces of syngas during turndown. The small amount of syngas generated during the turndown portion of the cycle will pass through the NOx traps, even after regeneration is complete.

Thus the control is simple, merely requiring the opening and closing of major inlet valves, and the savings are considerable since relatively little fuel is utilized through the fixed orifice 60 during the turn down portion of the cycle.

Figure 3:
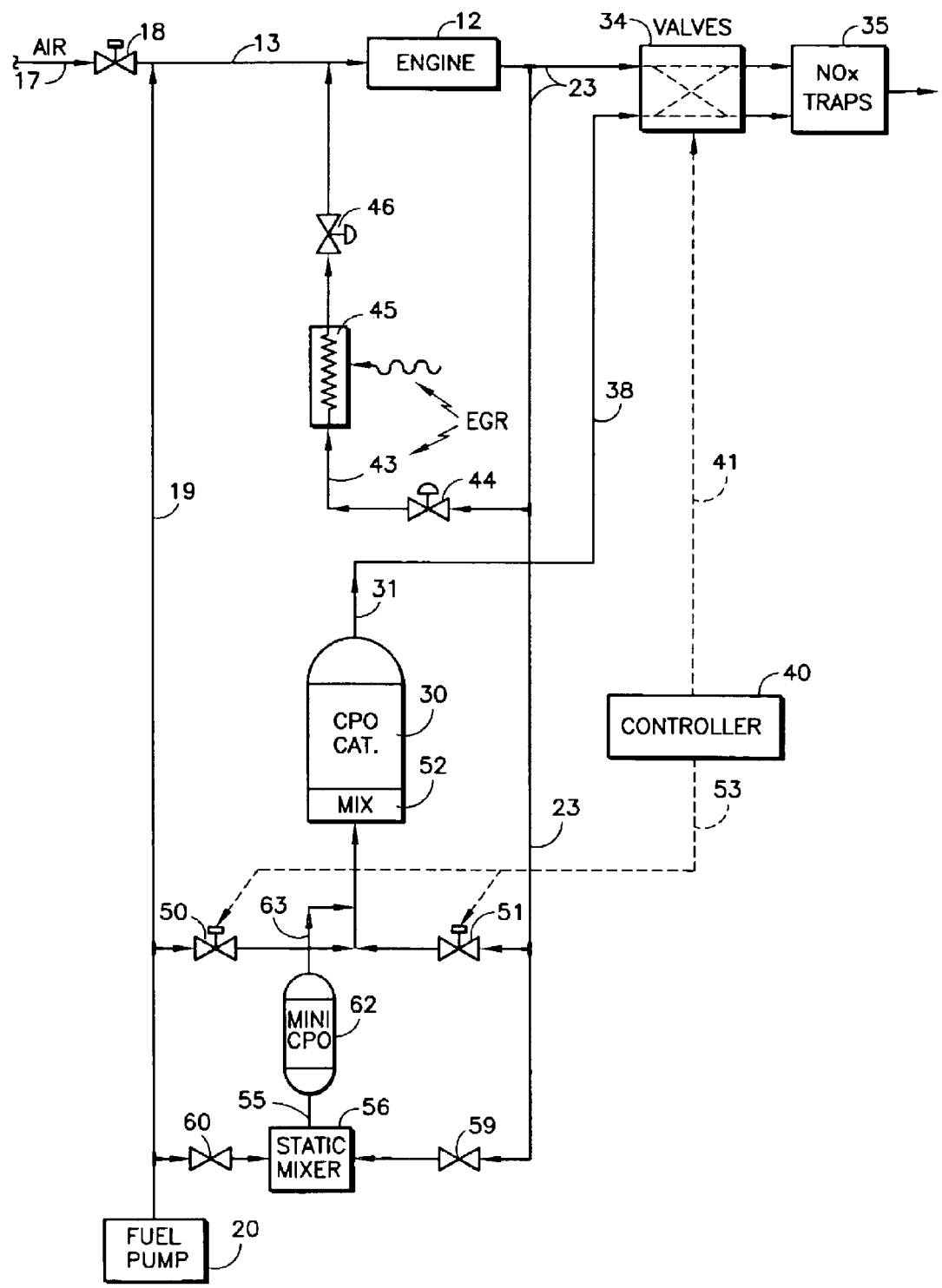
FIG. 3 is a schematic diagram of an engine system in which, during periods when the output of the CPO is not required, significantly reduced amounts of fuel and exhaust are applied to a mini-CPO which provides heat and hydrogen to the principal CPO in order to keep it warm and maintain a reduced environment.

The embodiment of FIG. 3 is the same as that of FIG. 2 except that there is provided a mini CPO 62 which receives the output of the static mixer 56 on line 55. The output of the mini-CPO on a line 63 is provided to the mixing section 52 of the CPO 30. Use of the mini CPO allows using less fuel since it provides both heat and syngas to the CPO 30, which keeps the major CPO 30 hot and also retains a reducing environment. All these allow re-start-up of the major CPO 30 easier without risk of passing the dangerous $O_2C$ stochiometry range. In this embodiment, the valves 59 and 60 remain on during engine operation so the mini CPO runs continuously. Although the provision of the mini CPO adds somewhat to the overall equipment cost, the savings in fuel utilized to maintain the temperature of the main CPO during the turndown portion of the cycle can be significant over periods of time.

The syngas may be used for quickly heating an exhaust catalyst, for particulate filter regeneration, and/or desulfurization of NOx trap adsorbents. In that case, the valve 33 (FIG. 1) could be a three-way valve.

In the described embodiments, the engine 12 operates on diesel fuel. If the invention is used with a gasoline engine, some air may be added to the mix at the inlet of the CPOs, to compensate for the low amount of oxygen in gasoline exhaust.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. In an internal combustion engine system which operates on fuel and which has an auxiliary system which intermittently uses an internally generated mixture including hydrogen and carbon monoxide ("syngas", hereinafter), a method comprising:

generating in a reformer at least an amount of syngas adequate for said auxiliary system;

repetitively, during operation of said engine, periodically applying said syngas to said auxiliary system in said adequate amount during first periods of time interspersed with second periods of time; and during said second periods of time, either (a) reducing the amount of said syngas generated so as to generate no more than a small fraction of said adequate amount of syngas, or (b) feeding a small amount of syngas generated by a continuously running mini CPO to said reformer.

2. In an internal combustion engine system which operates on fuel and provides exhaust, having oxides of nitrogen ("NOx", hereinafter) therein, to an NOx trap assembly having an adsorption material which is periodically regenerated with an internally generated mixture including hydrogen and carbon monoxide ("syngas", hereinafter) to said NOx trap, a method of providing syngas, comprising:

first, generating in a reformer syngas from said exhaust and said fuel in at least an amount effective to regenerate the adsorption material in said NOx trap assembly;

second, periodically applying at least said effective amount of said syngas to said NOx trap assembly for first periods of time on the order of 5–10 seconds long, interspersed with second periods of time which are about 8–20 times longer than said first periods of time; and third, altering either said first step or said second step during said second periods by either (a) reducing the amount of said fuel and said exhaust used to generate said syngas, so as to generate no more than a small fraction of said effective amount of syngas, or (b) feeding a small amount of syngas generated by a continuously running mini CPO to said reformer.

3. Apparatus for generating a mixture including hydrogen and carbon monoxide ("syngas", hereinafter), comprising:

an oxides-of-nitrogen ("NOx", hereinafter) trap assembly having an adsorption material which is periodically regenerated with syngas;

an internal combustion engine system which operates on fuel and provides, exhaust having NOx therein to said NOx trap assembly;

first means for generating syngas from said exhaust and said fuel in an amount effective to regenerate the adsorption material in said NOx trap assembly;

second means for periodically applying at least said effective amount of said syngas to said NOx trap assembly for first periods of time on the order of 5–10 seconds long, interspersed with second periods of time which are about 8–20 times longer than said first periods of time; and third means for altering the operation of either said first means or said second means during said second periods by either (a) reducing the amount of said fuel and said exhaust used to generate said syngas so as to generate no more than a small fraction of said effective amount of syngas, or (b) feeding a small amount of syngas generated by a continuously running mini CPO to said reformer.

4. Apparatus according to claim 3 wherein:

the adsorption material in said NOx trap assembly comprises barium carbonate.

* * * * *